US009478140B2

(12) United States Patent
Kathirvel et al.

(10) Patent No.: US 9,478,140 B2
(45) Date of Patent: Oct. 25, 2016

(54) SYSTEM AND METHOD FOR DISPLAYING TRAFFIC AND ASSOCIATED ALERTS ON A THREE-DIMENSIONAL AIRPORT MOVING MAP DISPLAY

(71) Applicant: HONEYWELL INTERNATIONAL INC., Morristown, NJ (US)

(72) Inventors: Kannan Kathirvel, Tamil Nadu (IN); Anil Kumar Songa, Karnataka (IN); Mohammed Ibrahim Mohideen, Karnataka (IN); Bill Nelson, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 118 days.

(21) Appl. No.: 14/473,445

(22) Filed: Aug. 29, 2014

(65) Prior Publication Data

US 2016/0063869 A1 Mar. 3, 2016

(51) Int. Cl.

| | |
|---|---|
| ***G08G 5/00*** | (2006.01) |
| ***G08G 5/06*** | (2006.01) |
| *G01C 23/00* | (2006.01) |
| *G08G 5/04* | (2006.01) |

(52) U.S. Cl.

CPC .......... *G08G 5/0043* (2013.01); *G08G 5/0008* (2013.01); *G08G 5/0021* (2013.01); *G08G 5/0047* (2013.01); *G08G 5/0078* (2013.01); *G08G 5/065* (2013.01)

(58) Field of Classification Search

CPC .. G08G 5/0043; G08G 5/008; G08G 5/0021; G08G 5/0047; G08G 5/0078; G08G 5/065; G08G 5/025; G08G 5/0004; G08G 5/0013

See application file for complete search history.

(56) References Cited

U.S. PATENT DOCUMENTS

| | | | | | |
|---|---|---|---|---|---|
| 6,683,541 | B2 | 1/2004 | Staggs et al. | | |
| 8,306,745 | B1 | 11/2012 | Clark et al. | | |
| 8,600,651 | B2 | 12/2013 | Clark et al. | | |
| 8,700,234 | B2 | 4/2014 | Shafaat et al. | | |
| 2006/0265109 | A1* | 11/2006 | Canu-Chiesa | B64D 43/00 | 701/3 |
| 2008/0106438 | A1* | 5/2008 | Clark | G08G 5/065 | 340/972 |
| 2009/0051570 | A1* | 2/2009 | Clark | G08G 5/0078 | 340/971 |
| 2009/0153343 | A1* | 6/2009 | Shafaat | G01C 23/005 | 340/686.1 |
| 2010/0017127 | A1* | 1/2010 | Pepitone | G08G 5/0078 | 701/301 |
| 2011/0125399 | A1* | 5/2011 | Clark | G08G 5/0008 | 701/532 |
| 2012/0130624 | A1 | 5/2012 | Clark et al. | | |
| 2013/0113635 | A1* | 5/2013 | Whitlow | G01C 23/00 | 340/945 |
| 2013/0113819 | A1* | 5/2013 | Gurusamy | G08G 5/065 | 345/592 |

FOREIGN PATENT DOCUMENTS

| | | | |
|---|---|---|---|
| EP | 2028633 | A2 | 8/2008 |
| EP | 1995708 | A1 | 11/2008 |
| EP | 2325825 | A2 | 5/2011 |

OTHER PUBLICATIONS

EP Extended Search Report for Application No. EP 15181644.4 Dated Feb. 12, 2016.

Shelton, K.J. et al.; Data-Link and Surface Map Traffic Intent Displays for NextGen 4DT and Equivalent Visual Surface Operations, NASA Langley Research Center, Hampton, VA; www.nasa.gov, 2009.

Barhydt, R. et al.; Experimental Studies of the Effect of Intent Information on Cockpit Traffic Displays, Aeronautical Systems Laboratory, Department of Aeronautics & Astronautics Massachusetts Institute of Technology Cambridge, Massachusetts; May 1997, ASL-97-3.

* cited by examiner

*Primary Examiner* — Dale Moyer

(74) *Attorney, Agent, or Firm* — Lorenz & Kopf, LLP

(57) ABSTRACT

A flight deck display system and method comprises a first source of host aircraft feature data and a second source of traffic data. A processor is coupled to the first and second sources and is configured to (a) receive host aircraft data; (2) receive traffic data; (3) filter traffic based on a predetermined set of separation criteria to identify vital traffic; (4) generate symbology graphically representative of vital traffic; (5) generate symbology graphically representative of the host aircraft; and (6) display the host aircraft and the vital traffic on an AMM display.

12 Claims, 8 Drawing Sheets

SYSTEM AND METHOD FOR DISPLAYING TRAFFIC AND ASSOCIATED ALERTS ON A THREE-DIMENSIONAL AIRPORT MOVING MAP DISPLAY

TECHNICAL FIELD

Embodiments of the subject matter described herein relate generally to avionics systems such as flight display systems and, more particularly, to a flight deck display system and method for generating a dynamic synthetic display of a three-dimensional (3D) airport moving map (AMM).

BACKGROUND

Modern flight deck displays for vehicles (such as aircraft or spacecraft) display a considerable amount of information, such as vehicle position, speed, altitude, navigation, target, and terrain information. Two-dimensional and three-dimensional AMM displays provide synthetic views of an airport environment that enhances flight crew position and situational awareness during both taxi operations and final approach. However, known techniques for displaying traffic symbology on 3D AMM displays suffer certain drawbacks. For example, displaying traffic symbology on a 3D AMM display clutters the displayed image. The degree of clutter and the complexity thereof depend on the airport size and the volume of traffic at any given time. Furthermore, human factors studies indicate that while navigating using 3D AMM, a pilot's attention becomes primarily occupied with the near field-of-view such that surrounding traffic at the more distant field-of-view (e.g., at the horizon) may not receive the same degree of attention.

Accordingly, it would be desirable to increase a pilot's situational awareness by providing an onboard avionics system and method that provides a flight crew with an improved graphical representation of the various features of an airport environment. It would further be desirable to provide an improved AMM that tags important relevant information concerning traffic (e.g., intent, location, aircraft type, airline, separation, threat level, etc.) while rendering traffic symbology. Such information will help bring an impending threat to a pilot's attention and determine corrective and/or preventative actions. It is still further desirable to provide an intuitive representation of traffic against which safe separation distance can be determined and maintained without becoming a threat. Other desirable features and characteristics will become apparent from the subsequent detailed description and the appended claims, taken in conjunction with the accompanying drawings and the foregoing technical field and background.

BRIEF SUMMARY

A method for enhancing situational awareness onboard a host aircraft during a ground maneuver is provided. The method comprises filtering traffic based on a predetermined set of separation criteria to identify vital traffic, generating symbology graphically representative of vital traffic, generating symbology graphically representative of the host aircraft, and displaying the host aircraft and the vital traffic on a cockpit display.

A method is also provided for displaying a dynamic synthetic view of an airport moving map on a flight deck display system. The method comprises receiving host aircraft data and receiving traffic data. The traffic is filtered in accordance with a predetermined set of separation criteria to identify vital traffic. Symbology graphically representative of vital traffic and the host aircraft is displayed on an AMM display.

A flight deck display system is also provided. The system comprises a first source of host aircraft feature data, a second source of traffic data, and a processor coupled to the first and second sources and configured to (a) receive host aircraft data, (2) receive traffic data, (3) filter traffic based on a predetermined set of separation criteria to identify vital traffic, (4) generate symbology graphically representative of vital traffic, (5) generate symbology graphically representative of the host aircraft, and (6) display the host aircraft and the vital traffic on an AMM display.

BRIEF DESCRIPTION OF THE DRAWINGS

A more complete understanding of the subject matter may be derived by referring to the following detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described herein can be deployed with any vehicle, including aircraft, automobiles, spacecraft, watercraft, and the like. The preferred embodiments of the system and methods described herein represent an intelligent way to present visual airport information to a pilot or flight crew during operation of the aircraft and, in particular, during taxi operations and final approach.

Figure 1:
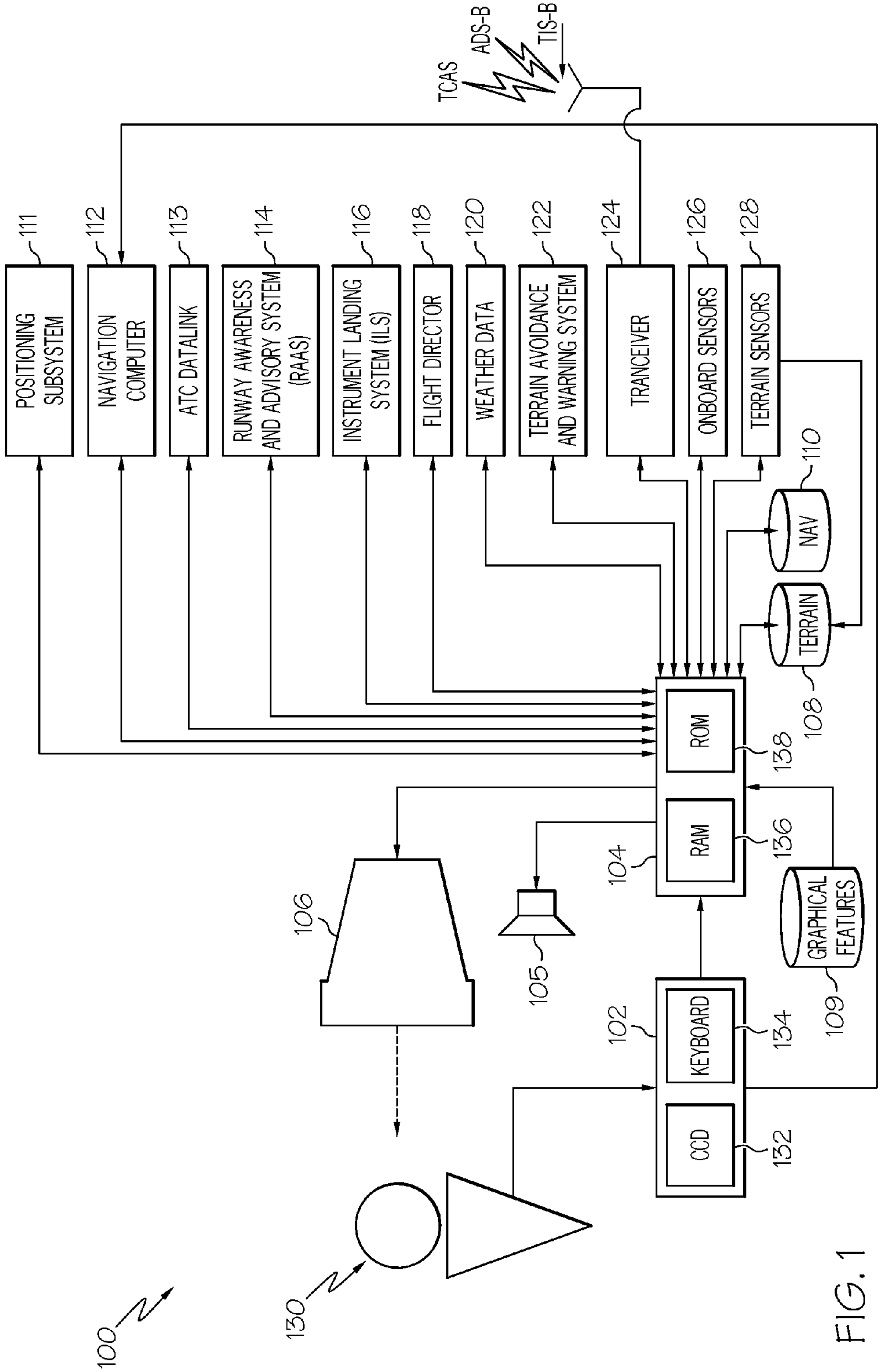
FIG. 1 is a block diagram of an embodiment of a flight deck display system in accordance with an exemplary embodiment.

Turning now to the drawings, FIG. 1 depicts an exemplary flight deck display system 100 (suitable for a vehicle such as an aircraft) that generally includes, without limitation: a user interface 102; a processor architecture 104 coupled to the user interface 102; an aural annunciator 105; and a display element 106 coupled to the processor architecture 104. The system 100 may also include, cooperate with, and/or communicate with a number of databases, sources of data, or the like. Moreover, the system 100 may include, cooperate with, and/or communicate with a number of external subsystems as described in more detail below. For example, the processor architecture 104 may cooperate with one or more of the following components, features, data sources, and subsystems, without limitation: one or more terrain databases 108; one or more graphical airport feature databases 109; one or more navigation databases 110; a positioning subsystem 111; a navigation computer 112; an air traffic control (ATC) data link subsystem 113; a runway awareness and advisory system (RAAS) 114; an instrument landing system (ILS) 116; a flight director 118; a source of weather data 120; a terrain avoidance and warning system (TAWS) 122; a wireless transceiver 124 for receiving TCAS (Traffic Collision Avoidance System), ADS-B (Automatic Dependent Surveillance Broadcast), and TIS-B (Traffic Information System Broadcast) data from neighboring aircraft, one or more onboard sensors 126, and one or more terrain sensors 128.

The user interface 102 is in operable communication with the processor architecture 104 and is configured to receive input from a user 130 (e.g., a pilot) and, in response to the user input, supply command signals to the processor architecture 104. The user interface 102 may be any one, or combination, of various known user interface devices including, but not limited to, a cursor control device (CCD) 132, such as a mouse, a trackball, or joystick, one or more buttons, switches, or knobs. In the depicted embodiment, the user interface 102 includes the CCD 132 and a keyboard 134. The user 130 manipulates the CCD 132 to, among other things, move cursor symbols that might be rendered at various times on the display element 106, and the user 130 may manipulate the keyboard 134 to, among other things, input textual data. As depicted in FIG. 1, the user interface 102 may also be utilized to enable user interaction with the navigation computer 112, the flight management system, and/or other features and components of the aircraft.

The processor architecture 104 may utilize one or more known general-purpose microprocessors or an application specific processor that operates in response to program instructions. In the depicted embodiment, the processor architecture 104 includes or communicates with onboard RAM (random access memory) 136, and onboard ROM (read only memory) 138. The program instructions that control the processor architecture 104 may be stored in either or both the RAM 136 and the ROM 138. For example, the operating system software may be stored in the ROM 138, whereas various operating mode software routines and various operational parameters may be stored in the RAM 136. It will be appreciated that this is merely exemplary of one scheme for storing operating system software and software routines, and that various other storage schemes may be implemented. It will also be appreciated that the processor architecture 104 may be implemented using various other circuits, not just a programmable processor. For example, digital logic circuits and analog signal processing circuits could also be used.

The processor architecture 104 is in operable communication with the terrain database 108, the graphical airport features database 109, the navigation database 110, and the display element 106, and is coupled to receive various types of data, information, commands, signals, etc., from the various sensors, data sources, instruments, and subsystems described herein. For example, the processor architecture 104 may be suitably configured to obtain and process real-time aircraft status data (e.g., avionics-related data) as needed to generate a graphical synthetic perspective representation of terrain in a primary display region. The aircraft status or flight data may also be utilized to influence the manner in which graphical features (associated with the data maintained in the graphical airport features database 109) of a location of interest such as an airport are rendered during operation of the aircraft. For the exemplary embodiments described here, the graphical airport features database 109 may be considered to be a source of airport feature data that is associated with synthetic graphical representations of one or more airport fields.

For this embodiment, the graphical airport features database 109 is an onboard database that contains pre-loaded airport feature data including geo-referenced features such as runway length, taxiway length, markings, signage, centerlines, etc. In alternate embodiments, some or all of the airport feature data can be loaded into the graphical features database 109 during flight. Indeed, some airport feature data could be received by the aircraft in a dynamic manner as needed. The airport feature data accessed by the processor architecture 104 is indicative of displayable visual features of one or more airports of interest. In practice, the airport feature data can be associated with any viewable portion, aspect, marking, structure, building, geography, and/or landscaping located at, on, in, or near an airport. The processing and rendering of the airport feature data will be described in more detail below.

Depending upon the particular airport field, the airport feature data could be related to any of the following visually distinct features, without limitation: a runway; runway markings and vertical signage; a taxiway; taxiway markings and vertical signage; a ramp area and related markings; parking guidance lines and parking stand lines; a terminal or concourse; an air traffic control tower; a building located at or near the airport; a landscape feature located at or near the airport; a structure located at or near the airport; a fence; a wall; a vehicle located at or near the airport; another aircraft located at or near the airport; a light pole located at or near the airport; a power line located at or near the airport; a telephone pole located at or near the airport; an antenna located at or near the airport; construction equipment, such as a crane, located at or near the airport; a construction area located at or near the airport; trees or structures or buildings located around the airport perimeter; and bodies of water located in or around the airport. More particularly, runway-specific feature data could be related to, or indicate, without limitation: arresting gear location; blast pad; closed runway; rollout lighting; runway centerlines; runway displaced thresholds; runway edges; runway elevation; runway end elevation; runway exit lines; runway heading; runway Land And Hold Short lines; runway intersections; runway labels; runway landing length; runway length; runway lighting;

runway markings; runway overrun; runway shoulder; runway slope; runway stop ways; runway surface information; runway that the host aircraft is approaching; runway threshold; runway weight bearing capacity; and runway width.

In certain embodiments, the processor architecture 104 is configured to respond to inertial data obtained by the onboard sensors 126 to selectively retrieve terrain data from the terrain database 108 or the terrain sensors 128, to selectively retrieve navigation data from the navigation database 110, and/or to selectively retrieve graphical features data from the graphical features database 109, where the graphical features data corresponds to the location or target of interest. The processor architecture 104 can also supply appropriate display commands (e.g., image rendering display commands) to the display element 106, so that the retrieved terrain, navigation, and graphical features data are appropriately displayed on the display element 106. Processor architecture 104 also provides appropriate commands to aural annunciator 105 (e.g. aural alert generating commands including those related to runway and taxiway alerts). The processor architecture 104 may be further configured to receive real-time (or virtually real-time) airspeed, altitude, attitude, waypoint, and/or geographic position data for the aircraft and, based upon that data, generate image rendering display commands associated with the display of terrain.

The display element 106 is used to display various images and data, in both a graphical and a textual format, and to supply visual feedback to the user 130 in response to the user input commands supplied by the user 130 to the user interface 102. It will be appreciated that the display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. The display element 106 may additionally be based on a panel mounted display, a HUD projection, or any known technology. In an exemplary embodiment, the display element 106 includes a panel display, and the display element 106 is suitably configured to receive image rendering display commands from the processor architecture 104 and, in response thereto, the display element 106 renders a synthetic graphical display having a perspective view corresponding to a flight deck viewpoint. In certain situations, the display element 106 receives appropriate image rendering display commands and, in response thereto, renders a synthetic representation of an airport field. The graphically rendered airport field might include conformal graphical representations of taxiways, runways, and signage rendered on the taxiways. To provide a more complete description of the operating method that is implemented by the flight deck display system 100, a general description of exemplary displays and various graphical features rendered thereon will be provided below.

As FIG. 1 shows, the processor architecture 104 is in operable communication with the source of weather data 120, the TAWS 122, and one or more transceivers 124 for receiving TCAS, ADS-B, and TIS-B data, and is additionally configured to generate, format, and supply appropriate display commands to the display element 106 so that the avionics data, the weather data 120, data from the TAWS 122, the TCAS (Traffic Collision Avoidance System), ADS-B (Automatic Dependent Surveillance Broadcast), and TIS-B (Traffic Information System Broadcast) data and the data from the previously mentioned external systems may also be selectively rendered in graphical form on the display element 106.

The terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in the terrain database 108 can be pre-loaded by external data sources or provided in real-time by the terrain sensors 128. The terrain sensors 128 provide real-time terrain data to the processor architecture 104 and/or the terrain database 108. In one embodiment, terrain data from the terrain sensors 128 are used to populate all or part of the terrain database 108, while in another embodiment, the terrain sensor 128 provides information directly, or through components other than the terrain database 108, to the processor architecture 104.

In another embodiment, the terrain sensors 128 can include visible, low-light TV, infrared, or radar-type sensors that collect and/or process terrain data. For example, the terrain sensors 128 can include a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in the terrain database 108 or processed for display on the display element 106.

In one embodiment, the terrain data provided to the processor architecture 104 is a combination of data from the terrain database 108 and the terrain sensors 128. For example, the processor architecture 104 can be programmed to retrieve certain types of terrain data from the terrain database 108 and other certain types of terrain data from the terrain sensors 128. In one embodiment, terrain data retrieved from the terrain sensor 128 can include moveable terrain, such as mobile buildings and systems. This type of terrain data is better suited for the terrain sensors 128 to provide the most up-to-date data available. For example, types of information such as water-body information and geopolitical boundaries can be provided by the terrain database 108. When the terrain sensors 128 detect, for example, a water-body, the existence of such can be confirmed by the terrain database 108 and rendered in a particular color such as blue by the processor architecture 104.

The navigation database 110 includes various types of navigation-related data stored therein. In preferred embodiments, the navigation database 110 is an onboard database that is carried by the aircraft. The navigation-related data include various flight plan related data such as, for example, and without limitation: waypoint location data for geographical waypoints; distances between waypoints; track between waypoints; data related to different airports; navigational aids; obstructions; special use airspace; political boundaries; communication frequencies; and aircraft approach information. In one embodiment, combinations of navigation-related data and terrain data can be displayed. For example, terrain data gathered by the terrain sensor 128 and/or the terrain database 108 can be displayed with navigation data such as waypoints, airports, etc. from the navigation database 110, superimposed thereon.

Although the terrain database 108, the graphical airport features database 109, and the navigation database 110 are, for clarity and convenience, shown as being stored separate from the processor architecture 104, all or portions of these databases 108, 109, 110 could be loaded into the onboard RAM 136, stored in the ROM 138, or integrally formed as part of the processor architecture 104. The terrain database 108, the graphical features database 109, and the navigation database 110 could also be part of a device or system that is physically separate from the system 100.

The positioning subsystem 111 is suitably configured to obtain geographic position data for the aircraft. In this regard, the positioning subsystem 111 may be considered to be a source of geographic position data for the aircraft. In practice, the positioning subsystem 111 monitors the current geographic position of the aircraft in real-time, and the real-time geographic position data can be used by one or more other subsystems, processing modules, or equipment on the aircraft (e.g., the navigation computer 112, the RAAS 114, the ILS 116, the flight director 118, or the TAWS 122). In certain embodiments, the positioning subsystem 111 is realized using global positioning system (GPS) technologies that are commonly deployed in avionics applications. Thus, the geographic position data obtained by the positioning subsystem 111 may represent the latitude and longitude of the aircraft in an ongoing and continuously updated manner.

The avionics data that is supplied from the onboard sensors 126 includes data representative of the state of the aircraft such as, for example, aircraft speed, altitude, attitude (i.e., pitch and roll), heading, groundspeed, turn rate, etc. In this regard, one or more of the onboard sensors 126 may be considered to be a source of heading data for the aircraft. The onboard sensors 126 can include MEMS-based, ADHRS-related or any other type of inertial sensor. As understood by those familiar with avionics instruments, the aircraft status data is preferably updated in a continuous and ongoing manner.

The weather data 120 supplied to the processor architecture 104 is representative of at least the location and type of various weather cells. The data supplied from the TCAS 124 includes data representative of other aircraft in the vicinity, which may include, for example, speed, direction, altitude, and altitude trend. In certain embodiments, the processor architecture 104, in response to the TCAS data, supplies appropriate display commands to the display element 106 such that a graphic representation of each aircraft in the vicinity is displayed on the display element 106. The TAWS 122 supplies data representative of the location of terrain that may be a threat to the aircraft. The processor architecture 104, in response to the TAWS data, preferably supplies appropriate display commands to the display element 106 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As previously alluded to, one or more other external systems (or subsystems) may also provide avionics-related data to the processor architecture 104 for display on the display element 106. In the depicted embodiment, these external systems include a flight director 118, an instrument landing system (ILS) 116, runway awareness and advisory system (RAAS) 114, and navigation computer 112. The flight director 118, as is generally known, supplies command data representative of commands for piloting the aircraft in response to flight crew entered data, or various inertial and avionics data received from external systems. The command data supplied by the flight director 118 may be supplied to the processor architecture 104 and displayed on the display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

The ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. The ILS 116 onboard the aircraft receives these signals and supplies appropriate data to the processor for display.

The RAAS 114 provides improved situational awareness to help lower the probability of runway incursions by providing timely aural advisories to the flight crew during taxi, takeoff, final approach, landing and rollout. The RAAS 114 uses GPS data to determine aircraft position and compares aircraft position to airport location data stored in the navigation database 110 and/or in the airport features database 109. Based on these comparisons, the RAAS 114, if necessary, issues appropriate aural advisories. Aural advisories, which may be issued by the RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

The navigation computer 112 is used, among other things, to allow the user 130 to program a flight plan from one destination to another. The navigation computer 112 may be in operable communication with the flight director 118. As was mentioned above, the flight director 118 may be used to automatically fly, or assist the user 130 in flying, the programmed route. The navigation computer 112 is in operable communication with various databases including, for example, the terrain database 108 and the navigation database 110. The processor architecture 104 may receive the programmed flight plan data from the navigation computer 112 and cause the programmed flight plan, or at least portions thereof, to be displayed on the display element 106.

The ATC datalink subsystem 113 is utilized to provide air traffic control data to the system 100, preferably in compliance with known standards and specifications. Using the ATC datalink subsystem 113, the processor architecture 104 can receive air traffic control data from ground based air traffic controller stations and equipment. In turn, the system 100 can utilize such air traffic control data as needed. For example, taxi maneuver clearance may be provided by an air traffic controller using the ATC datalink subsystem 113.

In operation, a flight deck display system as described herein is suitably configured to process the current real-time geographic position data, the current real-time heading data, the airport feature data, and possibly other data to generate image rendering display commands for the display element 106. Thus, the synthetic graphical representation of an airport field rendered by the flight deck display system will be based upon or otherwise influenced by at least the geographic position and heading data and the airport feature data.

With continued reference to FIG. 1, a wireless transceiver 124 receives navigational data from external control sources and relays this data to processor architecture 104. For example, wireless transceiver 124 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 124 may receive Automatic Dependent Surveillance-Broadcast (ADS-B) data and Traffic Collision Avoidance System (TCAS) from neighboring aircraft. TIS-B data, ADS-B data, and TCAS data and other such external source data is preferably formatted to include air traffic state vector information, which may be utilized to determine a neighboring aircraft's current position. Furthermore, in accordance with embodiments described herein, the TIS-B data, the ADS-B, and/or the TCAS data may also be formatted to include additional information useful in determining other characteristics of the neighboring aircraft.

Figure 2:
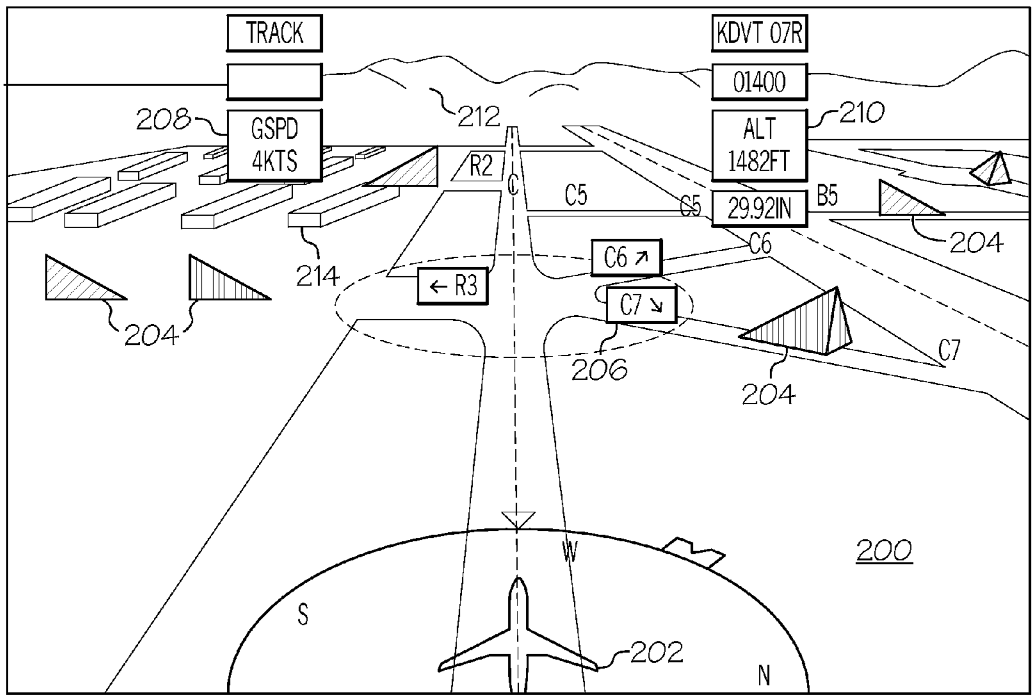
FIGS. 2-7 are graphical representations of a synthetic display having rendered thereon an airport field and related features in accordance with exemplary embodiments.

As stated previously, known techniques for displaying traffic symbology on 3D AMM displays suffer certain drawbacks. For example, displaying traffic symbology on a 3D AMM display clutters the displayed image. This is shown in FIG. 2 which illustrates a cluttered 3D AMM display 200 that contains host aircraft symbology 202, traffic symbols 204, runway and taxiway symbology 206, indicators such as ground speed 208 and altitude 210, and features such as terrain 212 and structures 214.

In accordance with an exemplary embodiment, there is provided, as described herein, a dynamic (i.e. smart) AMM display system, including dynamic display features, that improves the quality and timeliness of data provided on the display of the AMM, thus increasing crew situational awareness. Embodiments described herein contemplate the display of information designed to improve awareness and taxi planning. In accordance with this embodiment, the problem of loss of separation between a potential threat and a host aircraft is addressed by employing an intuitive representation of the traffic against which a safe separation distance should be maintained to prevent the traffic from becoming a threat. The selection of traffic to be represented on the display is based on criteria such as preceding traffic, crossing traffic near intersections, parallel traffic having large wing spans, traffic with high exhaust, pilot selectable input (e.g., when the pilot is asked to follow a preceding aircraft by ATC) and the like. In addition to generating the appropriate symbology, vital relevant information (e.g., intent, location in the airport, aircraft type, airline, threat level, separation, etc.) is displayed on, for example, a sign board generated on the AMM display.

In accordance with a further embodiment, a system and method is provided for identifying and filtering surrounding traffic that represents a potential threat to the a host aircraft as it moves along an assigned taxi route. This identification is based on several criteria related to the proximity, intent, and type of surrounding traffic along the assigned taxi route. This may be accomplished, by first selecting traffic that are within a predetermined range of the host aircraft. This predetermined range can either be a preselected value or configured by the pilot depending on the airport complexity. The identified traffic may then be filtered based on the heading of the host aircraft. The result of this filtering step is further improved by selecting a subset of the traffic that is to be displayed in the 3D AMM. This selection may be based on criteria such as the required separation from preceding traffic, wingspan separation from parallel traffic, traffic in the vicinity of an intersection that is being approached by the host aircraft, traffic that is out of view, and the like.

Figure 3:
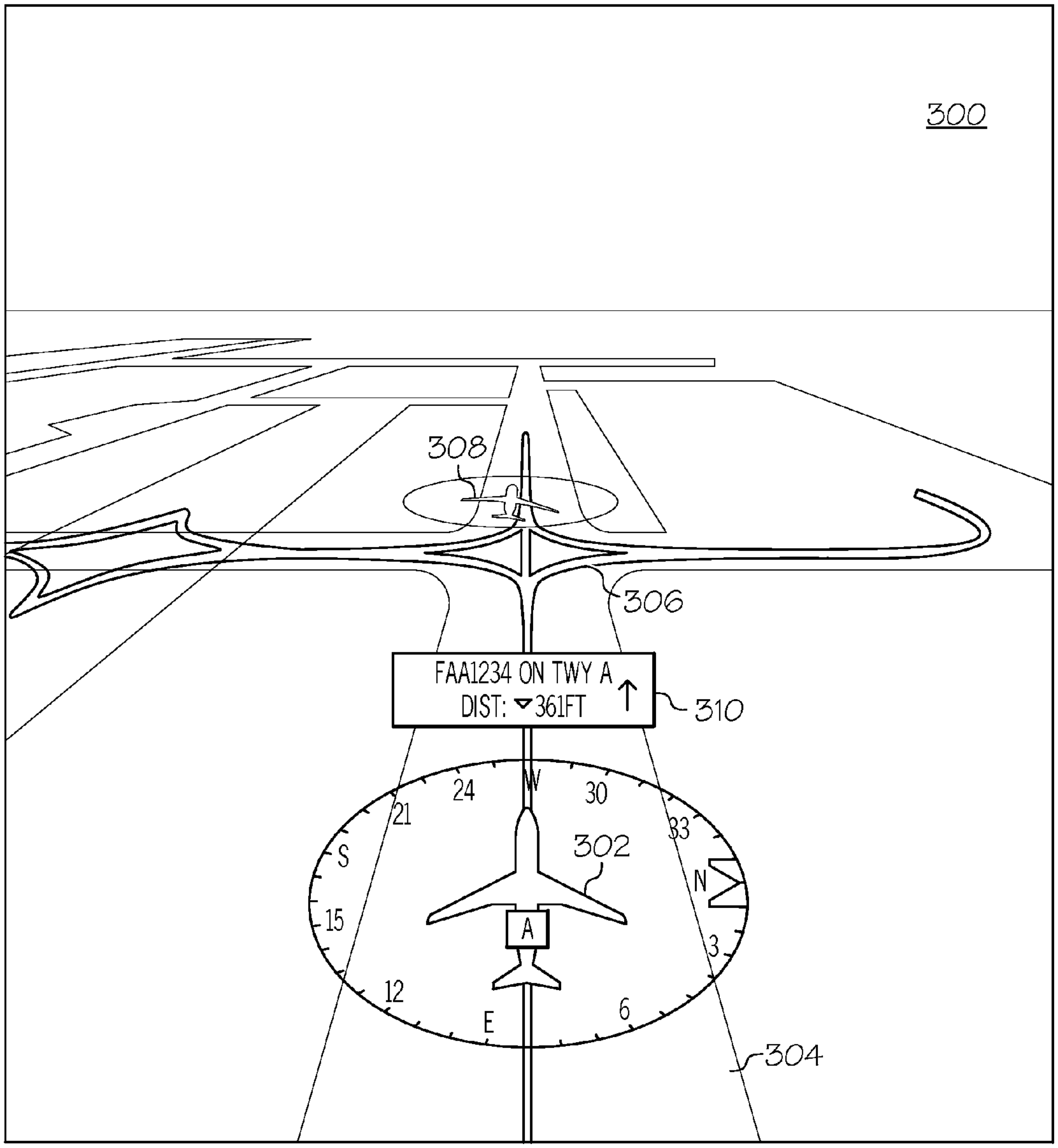

Referring to FIG. 3, the vital traffic that has been selected for display on the AMM may be uniquely represented on the display. As can be seen, FIG. 3 illustrates an uncluttered AMM display screen 300 including graphical representations host aircraft 302 on a runway 304 and approaching an intersection 306. Just beyond intersection 306 is a shadow representation 308 of vital traffic determined in the manner described above. The shadow may be graphically represented in a manner that indicates the level of proximity or threat to the host aircraft. For example, red could indicate that the distance between the traffic and the host aircraft is unsafe and amber might indicate that a safe separation margin has been reached. A cyan shadow might indicate that the separation distance is safe. In any event, the color will be chosen based on the threat level and will follow the color profile of existing traffic displays.

Referring still to FIG. 3, a virtual traffic signboard 310 may also be displayed on the AMM (e.g., in front of the host aircraft) for conveying to the host aircraft crew vital information associated with traffic represented by shadow 308 (hereinafter also referred to as the "vital traffic"). This may include the flight number, aircraft type, separation distance, Air Traffic Control (ATC) tower frequency, and the like. This data may be derived from the host aircraft and the location of the traffic on the airport surface. Traffic information may be extracted from TIS-B, ADS-B, TCAS, and/or or other similar systems. The described symbology and the information on sign-board 310 rapidly provides the crew with information about the vital traffic. Of course, the position of the sign-board 310 and the information displayed thereon is configurable and may include an indication of whether the traffic is separating or closing, the size of the traffic exhaust fume (i.e. a smaller aircraft preceding a larger aircraft requires a greater separation distance than does a small aircraft preceding another small aircraft), the amount of traffic congestion on a taxiway, the geometry of parallel aircraft (i.e. more wingtip separation is required while traversing parallel taxiways or runways having other traffic movement thereon), traffic beyond the pilot's field-of-view (i.e. when an aircraft is approaching the host aircraft from an area beyond the pilot's field-of-view and poses a threat), and the like. In addition, the number of aircraft preceding the vital traffic on the same taxiway may be displayed on sign-board 310. As an example, the sign-board 310 shown in FIG. 3 indicates that vital traffic 308 corresponding to flight number FAA1234 is on taxiway A and that the distance between traffic 308 and host aircraft 302 is 361 feet and closing. Of course, additional information could be displayed on the signboard depending on the software implementation, the current scenario or situation, pilot selection, or the like.

Figure 4:
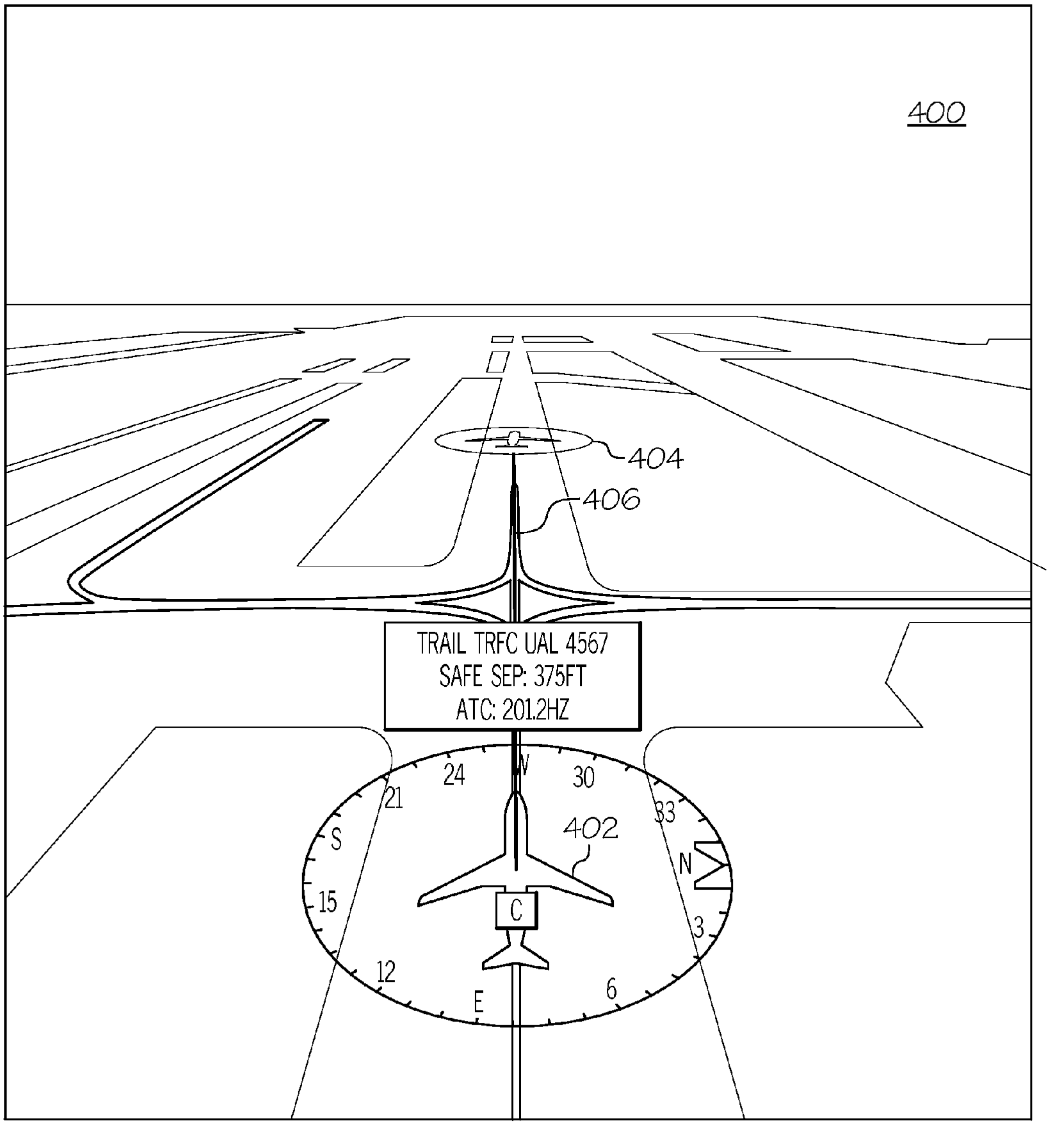

FIG. 4 illustrates an AMM display screen 400 wherein a host aircraft 402 depicted on runway 404 has been instructed by ATC to follow a preceding aircraft 404. A line 406 is displayed that connects the location of the host aircraft 402 and traffic 404 and indicates that both aircraft are travelling on the same taxiway. A signboard is also displayed instructing the host aircraft to trail traffic UAL4567 at a safe separation distance of 375 feet. In this case, the ATC tower frequency is also displayed on the sigh-board.

Figure 5:
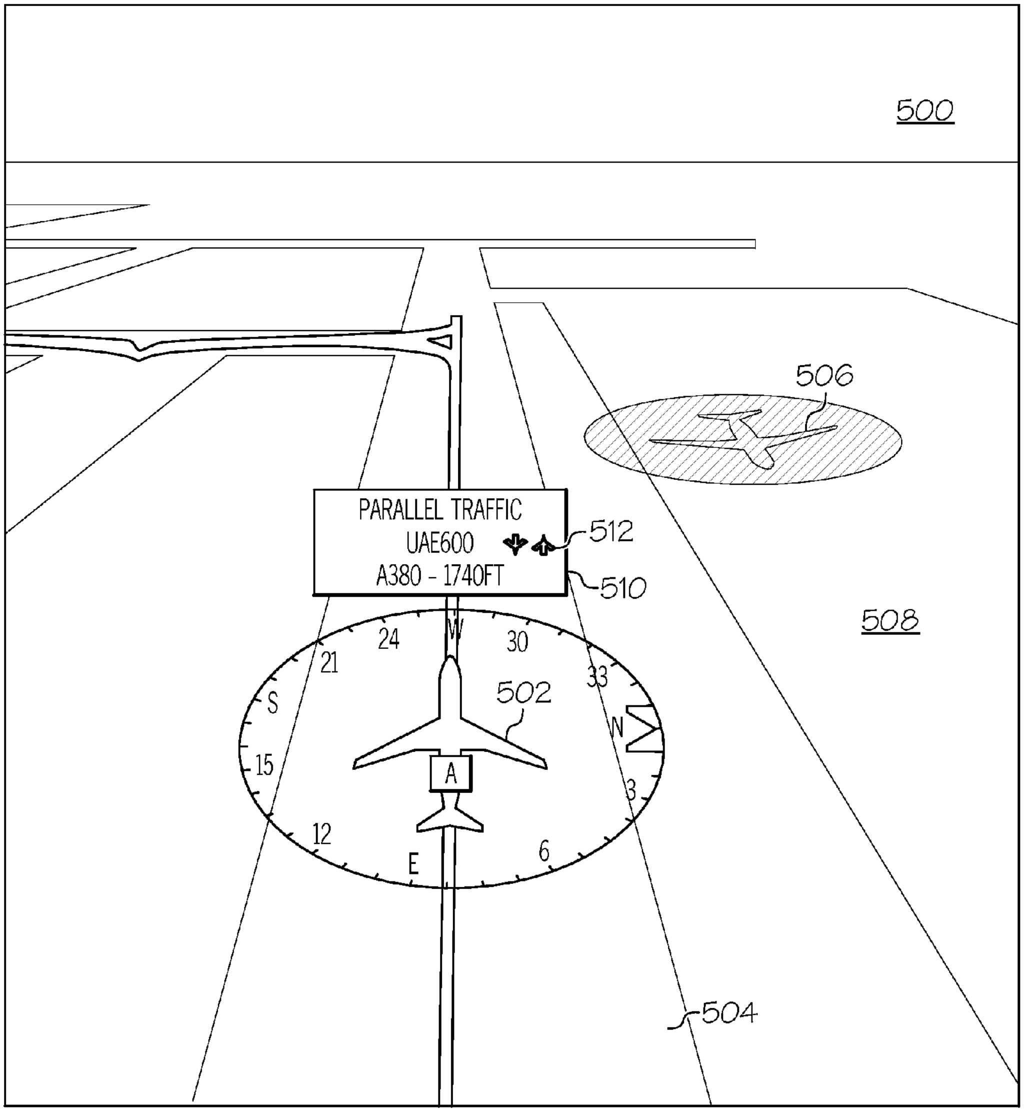

FIG. 5 illustrates an AMM display screen 500 wherein a host aircraft 502 on runway 504 has received a parallel traffic annunciation. In this case, a wing tip separation alert has been generated due to parallel vital traffic 506 approaching on, for example, an adjacent taxiway 508. As can be seen, sign-board 510 indicates that parallel traffic is approaching host aircraft 502. Aircraft icons 512 on sign-board indicate whether the host aircraft 502 and the traffic are passing from opposite directions or travelling in the same direction. In this case, the icons 512 indicate that they are approaching from opposite directions. "A380" refers the aircraft type and "1240 ft" represents the distance between the traffic aircraft and the host aircraft. Wing-tip clearance distance could also be displayed.

Figure 6:
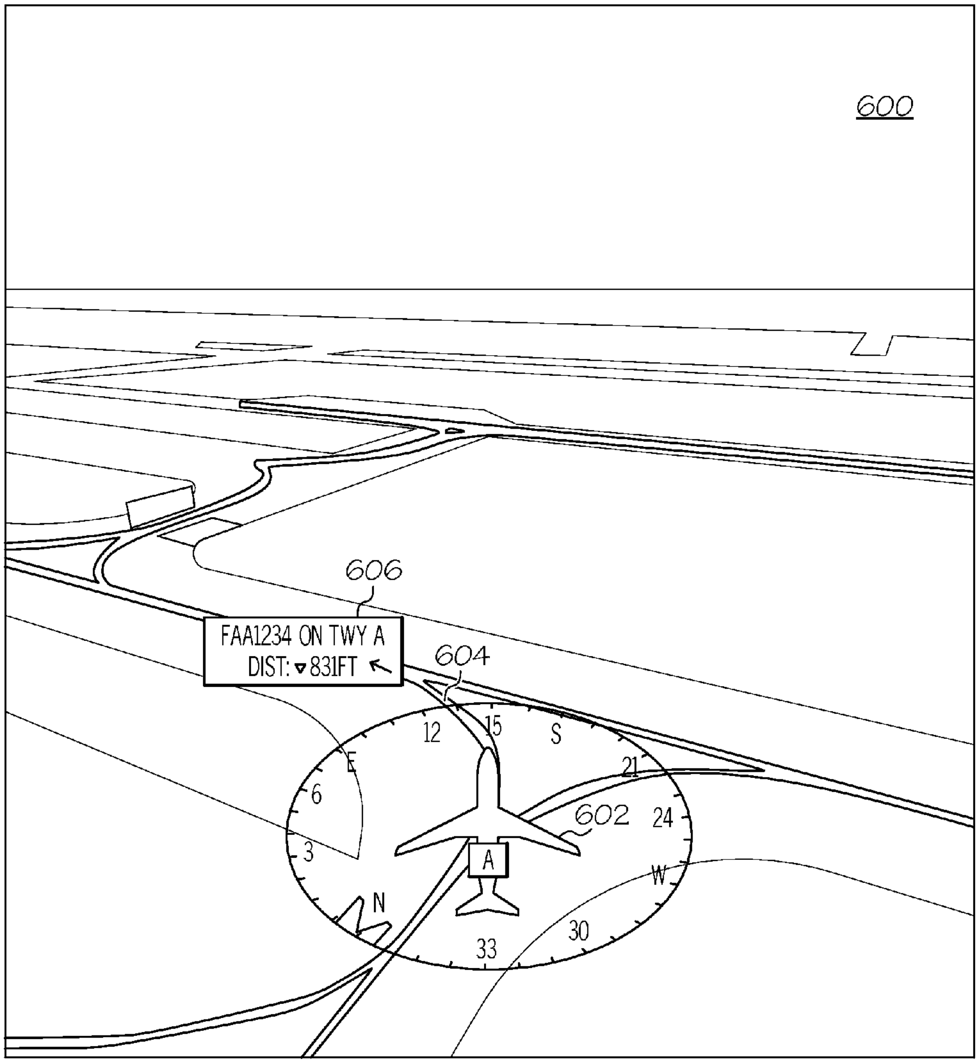

FIG. 6 illustrates an AMM display screen 600 wherein a host aircraft 602 is in the process of turning left onto taxiway 604. A sign-board 606 appears on display screen 600 informing the crew that flight FAA1234 is on taxiway 604 at a distance of 831 feet and is closing on host aircraft 602 even though flight FAA 1234 cannot yet be seen by the crew of host aircraft 602. Thus, the pilot of the host aircraft acquires traffic situational awareness in advance.

Figure 7:
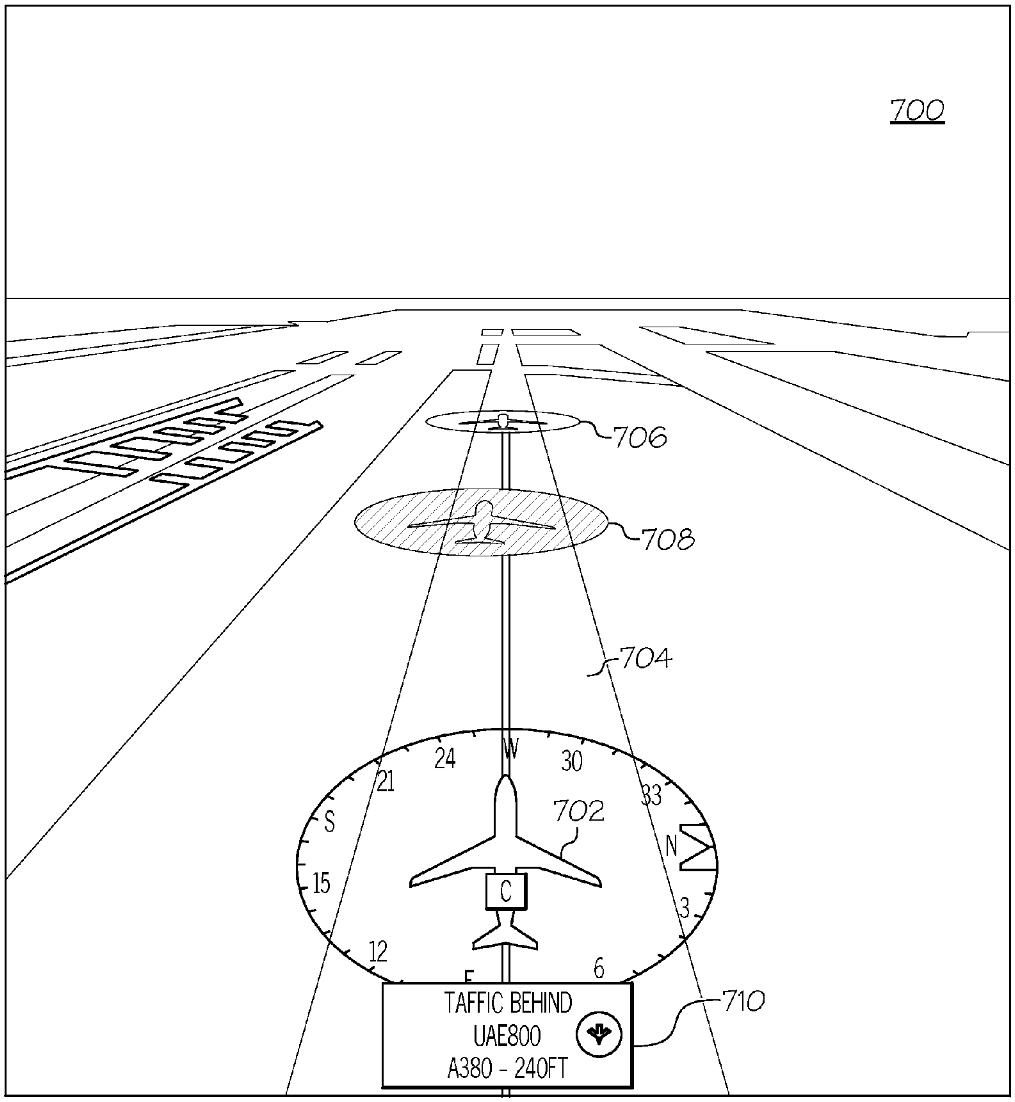

In FIG. 7, a display screen 700 is shown in including a host aircraft 702 on a runway or taxiway 704. Vital traffic 706 and 708 is shown on runway 704 in accordance with the techniques previously described. However, in this embodiment, a sign-board 710 is displayed behind host aircraft 702 informing crew members that flight UAE 600 is 1,240 feet behind host aircraft 702.

Figure 8:
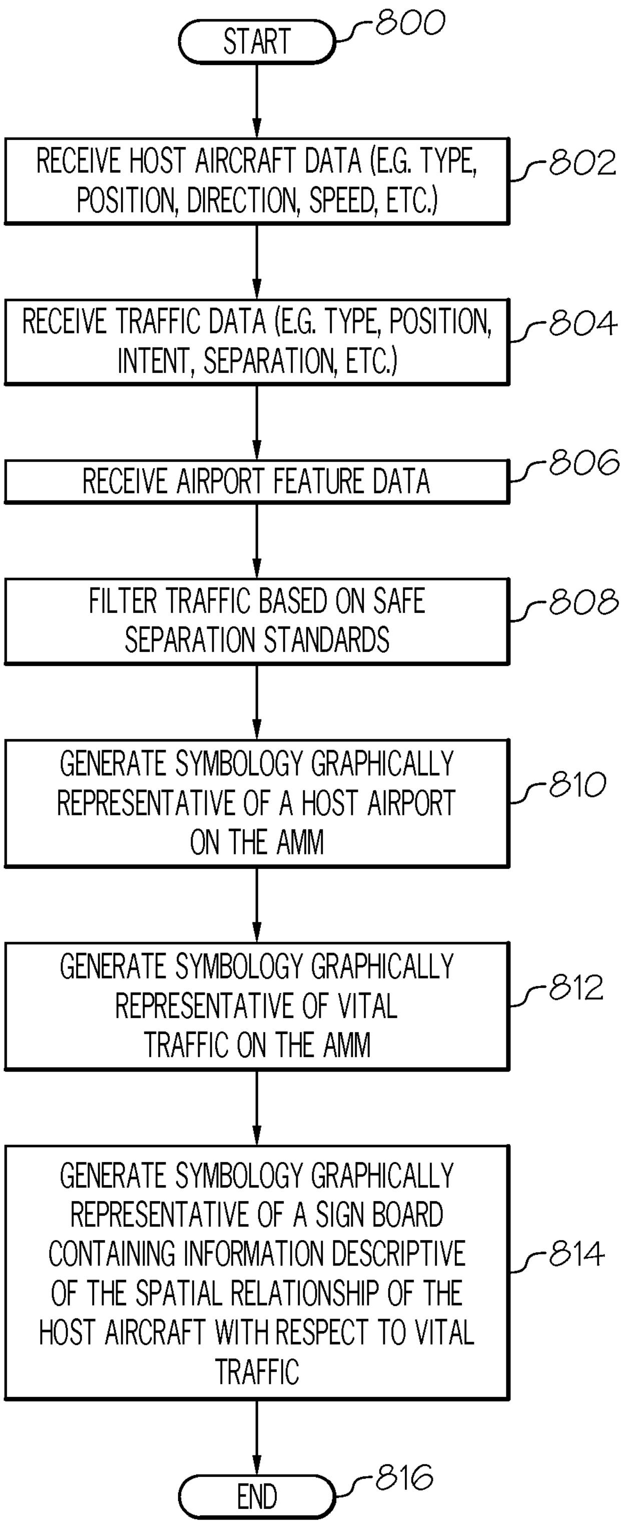
FIG. 8 is a flow chart that illustrates an exemplary embodiment of a process for rendering a dynamic AMM in accordance with an exemplary embodiment.

FIG. 8 is a flow chart that illustrates an exemplary embodiment of a method for rendering and displaying a dynamic airport moving map; i.e. displaying a dynamic synthetic view of an airport moving map on a flight deck display system, comprising receiving aircraft position data, receiving traffic data, filtering traffic based on a predetermined set of separation criteria to identify vital traffic, generating symbology graphically representative of vital traffic, generating symbology graphically representative of the host aircraft, and displaying the host aircraft and the vital traffic on a cockpit display.

The various tasks performed in connection with the process 800 may be performed by software, hardware, firmware, or any combination thereof. For illustrative purposes, the following description of the process 800 may refer to elements mentioned above in connection with FIG. 1. In practice, portions of the process 800 may be performed by different elements of the described system, such as the processing architecture or the display element. It should be appreciated that the process 800 may include any number of additional or alternative tasks, the tasks shown in FIG. 8 need not be performed in the illustrated order, and the tasks may be incorporated into a more comprehensive procedure or process having additional functionality not described in detail herein.

Although the process 800 could be performed or initiated at any time while the host aircraft is operating, this example assumes that the process 800 is performed as the aircraft is taxiing on a runway or taxiway. The process 800 can be performed in a virtually continuous manner at a relatively high refresh rate. For example, iterations of the process 800 could be performed in discrete steps or at a rate of 12-40 Hz (or higher) such that the flight deck display will be updated in substantially real time in a dynamic manner. In certain embodiments, the geographic position and heading data is obtained in real-time or virtually real-time such that it reflects the current state of the aircraft and surrounding traffic. The system also accesses or retrieves airport feature data (e.g. runway data including runway length, taxiways; etc.) that is associated or otherwise indicative of synthetic graphical representations of the particular airport field. The airport feature data might be maintained onboard the aircraft, and the airport feature data corresponds to, represents, or is indicative of certain visible and displayable features of the airport field of interest. The specific airport features data that will be used to render a given display will depend upon various factors, including the current geographic position and heading data of the aircraft.

The flight deck display system can process the geographic position data, the heading data, the airport feature data including runway data, taxiway data, and other data if necessary in a suitable manner to generate image rendering display commands corresponding to the desired state of the synthetic display. Accordingly, the rendered synthetic display will emulate the actual real-world view from the flight deck perspective after filtering. The image rendering display commands are then used to control the rendering and display of the synthetic display on the flight deck display. As explained in more detail below, the graphical representation of the airport field might include graphical features corresponding to taxiways and runways.

At any given moment in time, the dynamic AMM display rendered on the flight deck display element will include a graphical representation of taxiway and runway features as described above. An exemplary embodiment of the flight deck display system may render runway features using different techniques, technologies, and schemes.

The display may include graphical representations of various features, structures, fixtures, and/or elements associated with the airport field not shown here for clarity. For example, the synthetic display may include graphical representations of, without limitation: taxiway markings; a ramp area and related markings; parking guidance lines and parking stand lines; landscape features located at or near the airport field; terrain (e.g., mountains) located beyond the airport field; runway edges; runway shoulders; taxiway centerlines; taxiway edges or boundaries; taxiway shoulders; and airport terrain features. Of course, the various graphical features rendered at any given time will vary depending upon the particular airport of interest, the current position and heading of the aircraft, the desired amount of graphical detail and/or resolution, etc.

The various tasks performed in connection with the process 800 may be performed by software, hardware, firmware, or any combination thereof. For illustrative purposes, the following description of the process 800 may refer to elements mentioned above in connection with FIG. 1. In practice, portions of the process 800 may be performed by different elements of the described system, such as the processing architecture or the display element. It should be appreciated that the process 800 may include any number of additional or alternative tasks. The tasks shown in FIG. 8 need not be performed in the illustrated order and may be incorporated into a more comprehensive procedure or process having additional functionality not described in detail herein.

In connection with the process 800, the flight deck display system receives, analyzes and/or processes data related to the host aircraft (e.g., aircraft type, position, direction, speed, and the like (STEP 802). In a similar manner, the flight deck display system receives traffic data (e.g., aircraft type, position, intent, direction, separation speed, and the like (STEP 804). In addition, the flight deck display system receives airport feature data (e.g., runways, taxiways, and the like) (STEP 806).

Next, the traffic is filtered based on safe separation standards (e.g., preceding traffic, crossing traffic near intersections, parallel traffic having large wing spans, traffic with high exhaust, and the like) to identify vital traffic (STEP 808). In addition, the process may determine, calculate, or estimate the approximate distance to a particular airport feature and the time required for the aircraft to reach the designated feature and the time it takes for the aircraft to reach a designated feature, landmark, marker, point, or element associated with the airport field. For example, the system could determine the distance to an airport feature and the time it would take to reach the feature at the then current ground speed. The determinations made during STEP 808 will be influenced, based on, or otherwise dependent on the current geographic data, the speed of the aircraft, and/or other aircraft status data such as current heading data. For example, this could determine the approximate distance between the aircraft and a point on the runway.

At any point in time, the flight deck display system can render and display the taxiway/runway features using different visually distinguishable characteristics that indicate physical or temporal proximity to the aircraft and/or that are used to reduce clutter and provide a clean synthetic display. For instance, features that are features near to the current position of the aircraft might be rendered using a first set of visually distinguishable characteristics, while features further from the current position of the aircraft might be rendered using a second set of visually distinguishable characteristics. In this context, a visually distinguishable characteristic may be related to one or more of the following: color, brightness, transparency level, fill pattern, shape, size, flicker pattern, focus level, sharpness level, clarity level, shading, dimensionality (2D or 3D), resolution, and outline pattern. These visually distinguishable characteristics can be used to fade or introduce the signage into the display in a gradual manner.

In STEP 810, symbology graphically representative of the host aircraft is generated and displayed, as is symbology graphically representative of vital traffic in STEP 812. Next, in STEP 814, symbology graphically representative of a signboard is generated and displayed that conveys information descriptive of the spatial relationship of the host aircraft with respect to the vital traffic; e.g., separation distance, whether the vital traffic is separating or closing, the size of the traffic exhaust flume, (i.e. a smaller aircraft preceding a larger aircraft requires a greater separation distance than does a small aircraft preceding another small aircraft), the amount of traffic congestion on a taxiway, the geometry of parallel aircraft (i.e. more wingtip separation is required while traversing parallel taxiways or runways having other traffic movement thereon), traffic beyond the pilot's field-of-view (i.e. when an aircraft is approaching the host aircraft from an area beyond the pilot's field-of-view and poses a threat), and the like. In addition, the number of aircraft preceding the vital traffic on the same taxiway may be displayed on the signboard.

Thus, there has been provided a system and method for increasing a pilot's situational awareness by providing an onboard avionics system and method that provides a flight crew with an improved graphical representation of the various features of an airport environment. There has also been provided an improved AMM that tags important relevant information concerning traffic (e.g., intent, location, aircraft type, airline, separation, threat level, etc.) while rendering traffic symbology. Such information will help bring an impending threat to a pilot's attention and determine corrective and/or preventative actions. An intuitive representation of traffic against which safe separation distance can be determined and maintained without becoming a threat has also been provided.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for enhancing situational awareness onboard a host aircraft during a ground maneuver, the method comprising:

filtering traffic based on a predetermined set of criteria to identify an aircraft meeting the criteria, the aircraft defined as a vital traffic, wherein the predetermined set of criteria comprises a predetermined range from the host aircraft;

generating symbology graphically representative of the vital traffic;

generating symbology graphically representative of the host aircraft;

displaying the host aircraft and the vital traffic in a perspective view corresponding to a host aircraft flight deck viewpoint on an airport moving map (AMM) display;

generating symbology graphically representative of a signboard;

displaying the signboard on the airport moving map (AMM) display proximate to the host aircraft symbol; and displaying on the signboard a size of an exhaust fume of the vital traffic and a symbolic icon indicating at least one of (1) whether a distance between the host aircraft and the vital traffic is separating or closing, (2) whether the vital traffic and the host aircraft are headed in the same or opposite directions.

2. The method of claim 1, wherein filtering comprises filtering based on the heading of the host aircraft.

3. The method of claim 2 wherein filtering comprises selecting vital traffic based on a required separation distance between the host aircraft and preceding traffic.

4. The method of claim 1, wherein filtering comprises selecting vital traffic based on wingspan separation distance between the host aircraft and parallel traffic.

5. The method of claim 1, wherein filtering comprises selecting vital traffic based on traffic in the vicinity of an intersection being approached by the host aircraft.

6. The method of claim 1, wherein filtering comprises selecting vital traffic based on a location of out-of-view traffic.

7. The method of claim 1, further comprising displaying on the signboard at least one of (1) the existence of congestion on a taxiway and (2) a requirement to adjust wingtip separation.

8. The method of claim 7, further comprising displaying on the signboard at least one of (1) a flight identification number when the vital traffic is outside the field of view and (2) a number of preceding aircraft in the same runway.

9. The method of claim 1, wherein the predetermined range is expanded by the distance travelled by the aircraft in a predetermined period of time.

10. The method of claim 1, further comprising, when the host aircraft has been instructed by air traffic control (ATC)

to trail a preceding traffic by a specified separation distance, displaying (i) a line connecting the location of the host aircraft and the traffic, and (ii) displaying, on the signboard, the specified separation distance.

11. A flight deck display system, comprising:

a first source of host aircraft feature data;

a second source of traffic data; and a processor coupled to the first and second sources and configured to (a) receive host aircraft data; (2) receive traffic data; (3) filter traffic based on a predetermined set of separation criteria to identify an aircraft meeting the criteria, the aircraft defined as a vital traffic; (4) generate symbology graphically representative of the vital traffic; (5) generate symbology graphically representative of the host aircraft; and (6) display the host aircraft symbol and the vital traffic symbol in a perspective view corresponding to a host aircraft flight deck viewpoint and (7) display, proximate to the host aircraft symbol, a signboard comprising vital traffic information including a size of an exhaust fume of the vital traffic and a symbol indicating at least one of (1) whether a distance between the host aircraft and the vital traffic is separating or closing, (2) whether the vital traffic and the host aircraft are headed in the same or opposite directions.

12. The flight deck display system of claim 11, wherein the processor is further configured to, when the host aircraft has been instructed by air traffic control (ATC) to trail a preceding traffic by a specified separation distance, display (i) a line connecting the location of the host aircraft and the traffic, and (ii) display, on a signboard, information associated with the preceding traffic and the specified separation distance.

* * * * *